Patented May 6, 1952

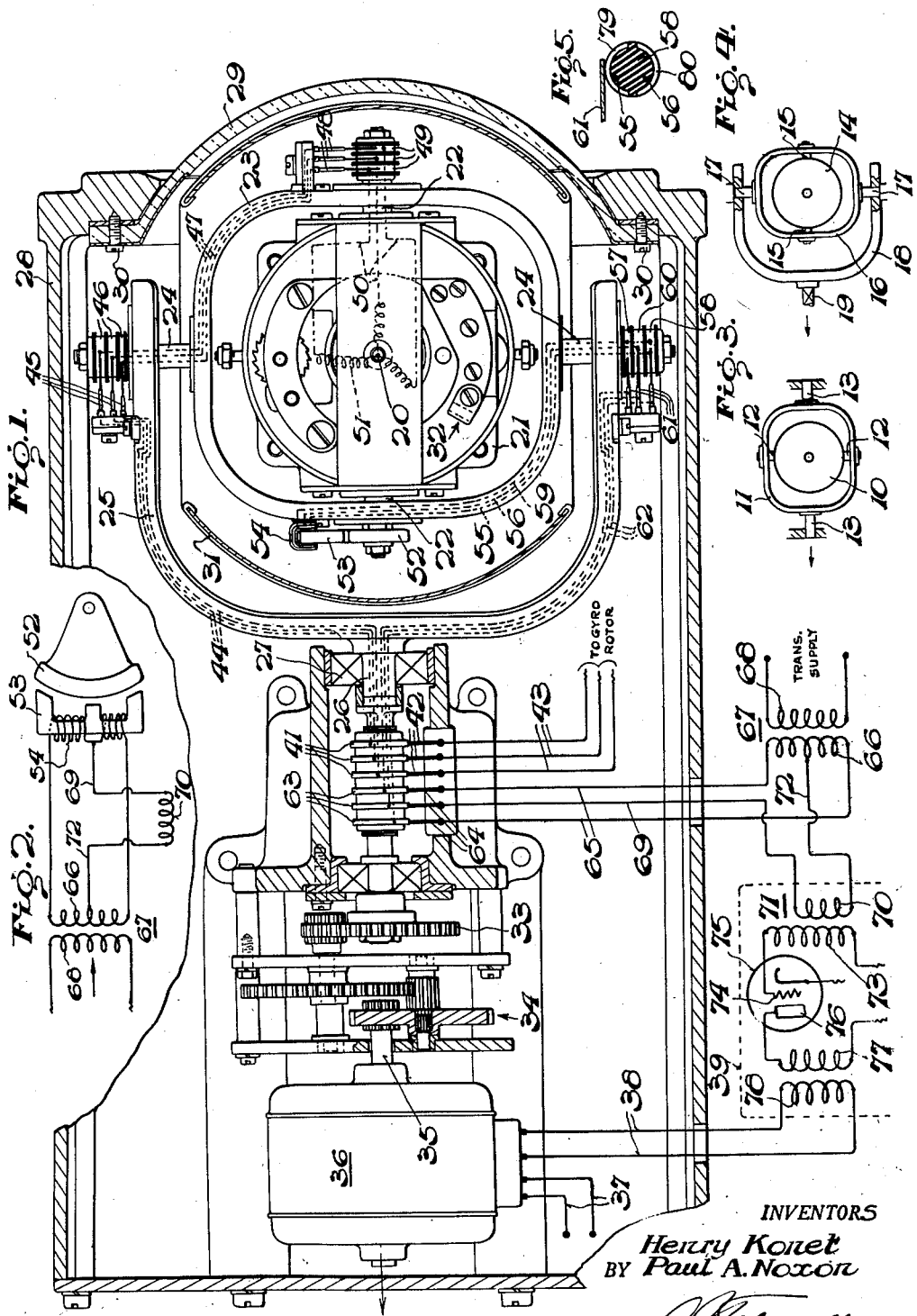

2,595,951

UNITED STATES PATENT OFFICE 2,595,951

ATTITUDE INDICATOR

Henry Konet, Paramus, and Paul A. Noxon, Tenafly, N. J., assignors to Bendix Aviation Corporation, Teterboro, N. J., a corporation of Delaware Application December 26, 1944, Serial No. 569,747

3 Claims. (Cl. 74—5.2)

The prevent invention relates generally to navigational instruments such as gyroscopic attitude indicators and more particularly to instruments of the character commonly referred to as artificial horizon gyroscopes.

Conventional artificial horizon gyroscopes generally comprise a rotor having a normally vertical spin axis mounted within a rotor casing which, in turn, is supported within a gimbal provided with inner and outer trunnions, the latter being mounted in the instrument casing and arranged parallel with the longitudinal craft axis, to impart to the rotor freedom about two mutually perpendicular horizontal axes. For normal flight conditions such gyroscopes admirably serve their intended purpose. However, they are practically useless during acrobatic or other violent craft maneuvers.

With the elimination of the usual limit stops, the conventional artificial horizon gyroscope is adapted to indicate full 360° roll but this is not true of the pitch axis because, in response to a vertical dive or climb, the outer gimbal trunnions will become aligned with the rotor spin axis so that the gyroscope loses one of its axes of freedom and as a result if any bank component is introduced at that moment the gyro will tumble. In order, therefore, to prevent injury to the gyro during such maneuvers it has been the practice to provide intricate caging devices with the use of which the gyro is locked about its axes of freedom to prevent injury thereto when acrobatic or other abnormal maneuvers are contemplated.

Modified instruments of the conventional character described have been provided with the intent as serving as non-tumbling free gyroscopes but these are based on the assumption that once a pilot places his ship into a loop, for example, he will continue the maneuver without introducing any bank component. The fact remains, however, that for all practical purposes such components will be introduced and the gyroscope will tumble when the rotor spin axis and the outer gimbal trunnions align so that the same disadvantages are present as those originally encountered.

An object of the present invention, therefore, is to provide a novel non-tumbling free gyroscope adapted for use as an artificial horizon whereby the disadvantages above set forth have been eliminated.

Another object of the invention is to provide a novel non-tumbling free gyroscope adapted for use as an artificial horizon with the use of which all requirement for a caging mechanism has been eliminated.

A further object of the invention is to provide a novel artificial horizon instrument adapted to give reliable response and readings throughout 360° of roll or pitch, and/or combinations of both so that reliable readings are provided throughout loops, rolls or any combination thereof.

Another object is to provide a novel navigational instrument which will provide the pilot with continuous attitude indications relative to the horizon throughout all aircraft maneuvers, the instrument being such as to allow full 360° freedom of indication about the craft roll and pitch axes.

Another and further object is to modify a conventional artificial horizon gyroscope in a novel manner by means of a novel mounting which is effective at all times to prevent the alignment of one of the axes of freedom with the rotor spin axis so that the gyroscope will possess freedom about all of its axes notwithstanding abnormal craft maneuvers.

Other and further objects and advantages of the invention will appear more fully hereinafter from a consideration of the detailed description which follows, taken together with the accompanying drawings. It is to be expressly understood, however, that the drawing is for the purpose of illustration only and is not designed as a definition of the limits of the invention.

In the drawings, wherein like reference characters refer to like parts throughout the several views, Figure 1 is a top elevation view partly in section and partly diagrammatic of the novel non-tumbling, free gyroscope of the present invention;

Figure 2 is a detail view of the electrical take-off circuit of the arrangement of Figure 1;

Figures 3 and 4 are illustrative views showing the difference between a conventional artificial horizon gyroscope and the novel gyroscope of the present invention; and, Figure 5 is a detail view of the reversing mechanism of the circuit shown in connection with the gyroscope of Figure 1.

Generally considered, a conventional artificial horizon gyroscope comprises a rotor provided with a normally vertical spin axis mounted within a rotor casing 10, as shown in Figure 3, the casing being mounted for oscillation within a gimbal 11 by way of minor trunnions 12, the gimbal, in turn, being mounted for oscillation on a fixed support by way of outer trunnions 13. The rotor is thus mounted for oscillation about two mutually perpendicular horizontal axes, one of which is defined by trunnions 12 normally arranged transversely with respect to a craft and the other of which is defined by trunnions 13 arranged parallel with the fore and aft craft axis. The inner trunnions are, therefore, referred to as the pitch axis and the outer trunnions as the bank axis.

For normal flight conditions, the conventional gyro reliably serves its function in indicating pitch and bank. In acrobatic flying, however, it becomes unreliable and must be centralized and locked to prevent damage thereto. By the elimination of limit stops, etc., such a gyro can be designed to indicate 360° roll but it cannot function in the same manner in response to pitch, the reason being that with a vertical climb or dive the outer trunnions 13 will align with the rotor spin axis thereby effectively destroying one of the gyro axes of freedom. Thereafter, the introduction of any bank component will cause the gyro to precess violently, this condition being known as "tumbling."

By the present invention a novel non-tumbling, free gyroscope is provided whereby all of the foregoing disadvantages including the requirement for a separate caging and centralizing device have been eliminated and whereby accurate and continuous response to and indications of bank and pitch due to rolling and/or looping or combinations of both will be obtained. These novel and desirable objects are obtained by the novel gyroscope hereof which, as shown in Figure 4, generally comprises a rotor provided with normally vertical spin axis mounted within a rotor casing 14 which is mounted by way of minor-minor trunnions 15 within an intermediate gimbal ring 16, the latter being mounted by way of minor trunnions 17 within an outer yoke or gimbal 18 which is supported for oscillation within a suitable fixed casing (not shown) by way of a major trunnion 19. Major trunnion 19 and minor-minor trunnions 15 are arranged parallel with the craft's fore and aft axis while minor trunnions 17 are arranged parallel with the craft's transverse axis. If no restraint whatever were provided on yoke 18 it would be free to assume any position it desired until such time as the minor trunnions 17 would line up with the rotor spin axis whereup freedom of the gyro about one of its axes of oscillation would be destroyed. Novel means, however, are provided, to be described more fully hereinafter, whereby such alignment is prevented and the minor trunnions are at all times maintained normal with the rotor spin axis. By virtue of such provision, the gyro is free about all of its axes at all times and will therefore accurately respond to looping, rolling, etc., without "tumbling."

Referring now to Figure 1 of the drawing for a more detailed description, the novel gyroscope constituting the subject matter of the present invention comprises a rotor (not shown) provided with normally vertical spin axis 20 mounted within a rotor casing 21. The casing, in turn, is supported by way of minor-minor trunnions 22 within an intermediate gimbal 23 which is supported by way of minor trunnions 24 within a yoke or outer gimbal 25, the latter being supported by way of a major trunnion 26 within a bearing 27 secured within an instrument casing 28.

The open end of casing 28 is closed by way of a suitable cover glass 29 which is fastened to the interior of the casing by means such as screws 30, for example. An indicating member 31 in substantially the form of a sphere is secured to the rotor casing to enclose intermediate gimbal 23 for relative up and down and lateral motion with respect to the front of the instrument where a fixed reference (not shown) is provided intermediate the sphere 31 and the cover glass. The specific indicating provision may be of the type shown and described more fully in copending application Serial No. 569,748, filed December 26, 1944, now Patent No. 2,588,755, issued March 11, 1952. Moreover, in order to overcome spin axis deviation from its normally vertical position due to bearing friction, acceleration, etc., an erecting mechanism, generally designated with the reference character 32, comprising a rolling ball and escapement mechanism, is provided. The erection system shown is of the type described and claimed in U. S. Patent No. 2,159,118, issued May 23, 1939.

In the foregoing manner the gyro rotor and its intermediate gimbal are concealed from view and in the event of complete loops or rolls or any combination thereof, some part of sphere 31 will be adjacent cover glass 29 and visible from the front of the instrument. With the arrangement thus far described, if the craft mounting the instrument were banked at substantially a 90° angle it may be that due to bearing friction or other causes the yoke 25 would remain fixed with casing 28 while the rotor casing had moved relative thereto so that minor trunnions 24 had aligned with the rotor spin axis whereby the gyro would become effectively locked about the pitch axis. If any pitch component were encountered at that point the gyro would tumble. In order to prevent such a condition from ever occurring, means are provided whereby the yoke 25 is at all times maintained in a predetermined relation with respect to the rotor casing so that minor trunnions 24 will be at all times maintained normal to the rotor spin axis and any condition of tumbling thereby eliminated.

To this end, therefore, i. e., that minor trunnions 24 may be maintained normal with respect to the rotor spin axis, the major trunnion 26 is extended to carry a gear 33, which through a speed reduction gearing, generally designated with the reference character 34, drivably connects yoke 25 with the shaft 35 of a driving motor 36 which may comprise a two phase induction motor whose fixed phase is fed by way of conductors 37 from a suitable source of alternating current (not shown) and whose variable phase is connected by way of conductors 38 with the output of an amplifier 39.

The gyro rotor, though it may be driven pneumatically, is shown as being driven electrically and, for this purpose, major trunnion 26 may be provided with a group of three slip rings 41 engaged by brushes 42 connected by way of conductors 43 with a suitable source of energizing current (not shown). Slip rings 41 connect by way of conductors 44, passing through trunnion 26 and yoke 25, with brushes 45 which engage slip ring 46, the latter being connected through conductors 47, passing through one of trunnions 24 and gimbal 23, with brushes 48 which engage slip rings 49, these being connected through conductors 50 with the windings 51 of the gyro motor.

Secured to an extension of one of the minor-minor trunnions 22 is a soft iron vane 52 which cooperates with a stator 53 carrying thereon a split coil 54, the vane thus defining a rotor while the stator 53 with its coil is fastened to intermediate gimbal 23 whereby relative motion of the rotor and stator will place more iron in one section of the coil than the other with results to be presently described. The outer ends of coil 54 are connected by way of conductors 55 and 56 with slip rings 57 and 58 while the midpoint of the coil is connected by way of a conductor 59 with slip ring 60. Rings 57, 58 and 60 are engaged by brushes 61, which connect through conductors 62 with a second set of three slip rings 63 on trunnion 26. The latter rings are engaged by brushes 64 which connect through outer conductors 65 with the secondary 66 of a transformer 67 whose primary 68 connects with a suitable source of supply (not shown), the intermediate one of brushes 63 being connected through a conductor 69 with the primary 70 of a transformer 71 at the amplifier input, the other side of such primary connecting through a conductor 72 with a midpoint of secondary 66. The signal take-off arrangement above described is more fully shown and described in copending application Serial No. 514,523, filed December 16, 1943, now Patent No. 2,438,406, issued March 23, 1949.

The secondary 73 of transformer 71 connects with grid 74 of a conventional vacuum tube 75 whose plate element 76 is connected to a primary winding 77 at the amplifier output whose inductively coupled secondary 78 connects through conductors 38 with the variable phase of motor 36. As is well known in the art a condenser (not shown) may be arranged at either the fixed or variable phase of the motor to provide the necessary 90° phase displacement therebetween.

The particular take-off arrangement thus far described has no reversing characteristic which it will require after the craft carrying the instrument of the present invention has looped 180°. To effect the required reversal, therefore, slip rings 57 and 58 are each provided with two spaced conducting sections 79 and 80 which are insulated from each other. One of the sections is connected with conductor 55 while the opposite section is connected with conductor 56. One of these rings i. e., ring 58 is shown in Figure 5 while slip ring 57 will be exactly the same except that conductor 56 will be connected to the top conducting section 79 while conductor 55 will connect with the lower conducting section 80.

As already pointed out above, a non-tumbling free gyroscope is provided hereby so long as minor trunnions 24 are maintained normal with the rotor spin axis 20. This desirable relation is obtained and maintained by the signal take-off 52—54 and motor 36 hereinabove described because as soon as yoke 25 is urged from a predetermined relation it will tend to carry intermediate gimbal 23 therewith as well as trunnions 24. Motion of the gimbal relative to rotor casing 21, however, provides relative motion between rotor 52 and coil 54 so that more current will flow in the upper section of coil 54, for example, or if rotor motion is in an opposite direction more current will flow in the lower section of the coil so that the circuit, which constitutes an inductive bridge arrangement more clearly illustrated in Figure 2, will become unbalanced and current will flow in one direction or another within secondary 70 of transformer 71. The signal thus developed is amplified within amplifier 39 to energize the variable phase of motor 36 whereupon the motor operates through speed reduction gearing 34 to angularly displace yoke 25 until it moves gimbal 23 sufficiently to a position wherein rotor vane 52 assumes a central or null position relative to coil 54 at which time the bridge is rebalanced and no current appears at secondary 70 so that the motor is de-energized. Any subsequent departure from the desired relationship set forth again provides a signal at secondary 70 to energize the motor and operate yoke 25 until the signal at secondary 70 again drops to zero.

In this manner, the minor trunnions 24 are prevented from ever lining up with the rotor spin axis which is the only condition under which the gyro would be locked and, therefore, tumble in response to a pitch condition. It will now be apparent to those skilled in the art that a novel non-tumbling, free gyroscope has been provided which eliminates the requirement for centralizing and locking expedients and which, moreover, is adapted to provide accurate and reliable responses through all craft maneuvers including loops and rolls and/or combinations thereof.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art. For a definition of the limits of the invention, reference will be had primarily to the appended claims.

We claim:

1. A system for universally supporting a gyroscope from a mobile vehicle comprising, a main gimbal ring support for said gyroscope having a first pivotal axis and a second pivotal axis normal thereto, an auxiliary gimbal ring supporting said first ring and having a pivotal axis normally coinciding with said first pivotal axis, power means for rotating said auxiliary gimbal ring about its pivotal axis, means responsive to rotation of said main gimbal ring about said first pivotal axis for controlling said power means to cause said auxiliary gimbal ring to position said main ring to maintain the rotation thereof about said first axis within predetermined limits, and means responsive to rotation of said auxiliary ring about said second pivotal axis through the normal to the plane of said main ring for reversing the sense of action of said controlling means.

2. A system for universally supporting a gyroscope from a mobile vehicle comprising, a main gimbal ring support for said gyroscope having a first pivotal axis and a second pivotal axis normal thereto, an auxiliary gimbal ring supporting said first ring and having a pivotal axis normally coinciding with said first pivotal axis, power means for rotating said auxiliary gimbal ring about its pivotal axis, means responsive to rotation of said main gimbal ring about said first pivotal axis for controlling said power means to cause said auxiliary gimbal ring to maintain said main ring approximately normal to the spin axis of said gyroscope, and means responsive to rotation of said auxiliary ring about said second pivotal axis through the normal to the plane of said main ring for reversing the sense of action of said controlling means.

3. A system for universally supporting a gyroscope from a mobile vehicle comprising, a main gimbal ring support for said gyroscope having a first pivotal axis and a second pivotal axis normal thereto, an auxiliary gimbal ring supporting said first ring and having a pivotal axis normally coinciding with said first pivotal axis and approximately parallel to the longitudinal axis of the vehicle, power means for rotating said auxiliary gimbal ring about its pivotal axis, means responsive to rotation of said main gimbal ring about said first pivotal axis for controlling said power means to cause said auxiliary gimbal ring to position said main ring to maintain the rotation thereof about said first axis within predetermined limits, and means responsive to rotation of said auxiliary ring about said second pivotal axis through the vertical for reversing the sense of action of said controlling means.

HENRY KONET.
PAUL A. NOXON.

REFERENCES CITED

The following references are of record in the file of this patent:

UNITED STATES PATENTS

| Number | Name | Date |
|---|---|---|
| 2,367,667 | Carter | Jan. 23, 1945 |
| 2,390,532 | Haskins, Jr., et al. | Dec. 11, 1945 |
| 2,409,875 | Martin | Oct. 22, 1946 |